United States Patent

[11] 3,594,617

| [72] | Inventor | John H. Kennedy<br>Santa Barbara, Calif. |
|------|----------|------------------------------------------|
| [21] | Appl. No. | 852,572 |
| [22] | Filed | Aug. 25, 1969 |
| [45] | Patented | July 20, 1971 |
| [73] | Assignee | The Bissett-Berman Corporation<br>Santa Monica, Calif. |

[54] SOLID ELECTROLYTE ELECTROLYTIC CELL INDURING SILVER BROMIDE THEREIN
6 Claims, 5 Drawing Figs.

[52] U.S. Cl. .................................................. 317/230, 317/231
[51] Int. Cl. ................................................... H01g 9/00
[50] Field of Search .......................................... 317/230, 231, 232, 233, 237

[56] References Cited
UNITED STATES PATENTS

| 1,715,789 | 6/1929 | Ruben | 317/230 |
| 2,616,953 | 11/1952 | Booe | 317/230 |
| 3,160,797 | 12/1964 | Kanai | 317/231 |
| 3,423,648 | 1/1969 | Mintz | 317/231 |
| 3,443,997 | 5/1969 | Argue et al. | 136/83 |
| 3,499,796 | 3/1970 | Hever et al. | 136/83 |

Primary Examiner—James D. Kallam
Attorney—Smyth, Roston & Pavitt

ABSTRACT: An electrolytic cell using a solid electrolyte such as polycrystalline silver bromide or silver sulfide bromide. A first electrode is formed from a powdered active metal such as powdered silver and the solid electrolyte is also formed from a powdered substance such as silver bromide or silver sulfide bromide. A second electrode is formed from a powdered inert metal such as powdered gold and the entire structure including the two electrodes sandwiching the solid electrolyte is then pressed together at a very high pressure to form the solid electrolyte electrolytic cell.

PATENTED JUL 20 1971
3,594,617
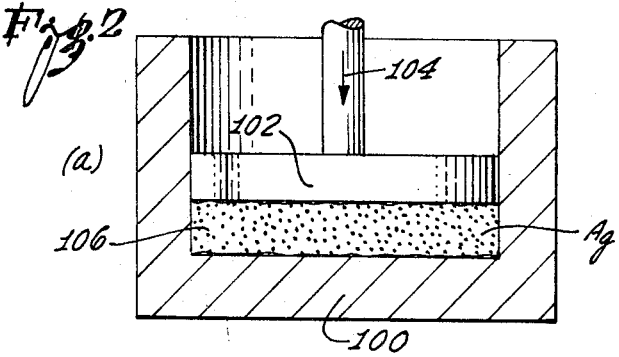
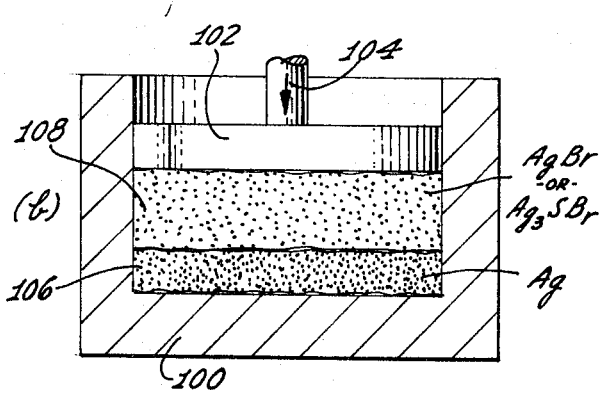
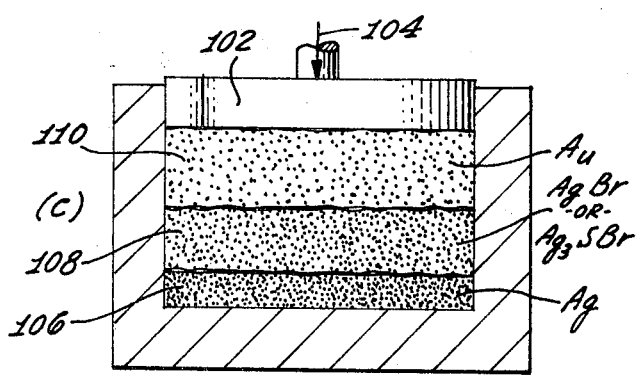
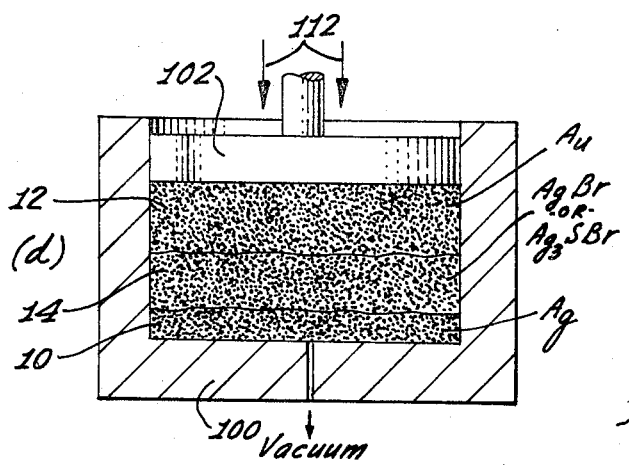
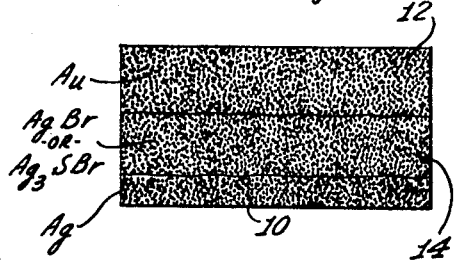
INVENTOR:
John H. Kennedy
ATTORNEYS

SOLID ELECTROLYTE ELECTROLYTIC CELL INDURING SILVER BROMIDE THEREIN

The present invention is directed to an electrolytic cell using a solid electrolyte. During recent years there has been considerable interest in miniature coulometers for use in integrating and timing functions. Most of these miniature coulometers have used liquid electrolytes. It would be desirable to use a solid electrolyte in place of the conventional liquid electrolytes, but prior art cells using solid electrolytes have not been satisfactory for use where the cell is to perform coulometric functions.

Certain problems are associated specifically with solid electrolytes used in cells which operate as coulometers. These problems are as follows: First, the solid electrolyte must have an acceptable conductivity over a required temperature range. Secondly, the electrolyte must have a high current efficiency over the required temperature range to yield coulometric cells with high accuracy, long charge hold capability and also sufficient charge capability. Third, the electrolyte must produce an acceptable voltage cutoff characteristic so as to allow the coulometric cell to be part of a practical system. The voltage cutoff characteristics are primarily a function of the electrode-solid electrolyte interface effects and the electrolyte composition.

Silver compounds have certain properties which make them particularly attractive for coulometric cells. First, the silver compounds have conductivities which are quite high compared to other solid materials and, secondly, the conduction mechanism for silver compounds is mainly via the silver ion transference. The basic structure of these coulometric cells is relatively simple. Generally the coulometric cells consists of first and second electrodes sandwiching the solid electrolyte.

Specifically, the cell may include a first silver electrode and a second gold electrode sandwiching the solid electrode. The amount of silver is transferred electrolytically to the gold and this is generally called the "charging operation." The silver may be transferred back to the silver electrode, which is called the "stripping operation." While the silver remains on the gold electrode, the system is essentially a silver-silver couple and the voltage across the cell is predominantly the IR drop through the electrolyte. As the silver becomes depleted during the stripping operation, the silver activity on the gold drops and the voltage across the cell begins to rise. When the silver is completely stripped off, the voltage may rise to over 1 volt as the gold begins to oxidized. This voltage rise may be used to activate a trigger circuit.

Since the process as described above is electrolytic, the electrolyte must be an ionic conductor with a negligible electronic conductivity. Theoretically, if the same fraction of the current was electronic in both the charging and stripping operations, accurate timing could still be accomplished. However, any idle time between charging and stripping, which is called "charge hold," would allow the electronic contribution to act as a short, thereby changing the charge setting until the open circuit voltage reached exactly zero. Also in practice, the voltage drops are different for the charging and stripping operations because of electrode polarization, which would cause the electronic contribution to be different for the charging and stripping operations.

One aspect of the present invention is directed to a method of preparing the electrolytic cell so as to achieve an increase in the interface contact between the electrode and the electrolyte. This increase in interface contact would decrease electrode polarization, which in turn would increase the accuracy of the cell. This method of preparation includes the following steps. A first powdered electrode material such as powdered silver is pressed relatively lightly together into a desired shape and so as to define a first surface which would appear flat upon a macroscopic examination of the surface. However, a microscopic examination of this first surface would show that it contained a great number of small irregularities. These small irregularities are advantageous since they allow the solid electrolyte to have a greater interface contact with the electrodes.

The solid electrolyte material is then placed on top of the lightly pressed electrode material and the solid electrolyte material is also lightly pressed so that the electrolyte is in contact with the front surface to form a first interface and so as to form a second surface on the solid electrolyte substantially similar to the first surface of the first electrolyte. The second electrode material such as powdered gold is placed on top of the second surface of the solid electrolyte and is lightly pressed so that the second electrode is in contact with the second surface of the solid electrolyte to form a second interface. The entire sandwich structure is then pressed together under high pressure so that the electrodes and solid electrolyte are tightly compressed and so that a close surface contact between the electrodes and the electrolytic material is achieved at the first and second interfaces. In order to facilitate this close surface contact and to remove gases trapped within the cell structure, a vacuum may be pulled on the cell as the cell is under the high pressure.

Another aspect of the present invention is directed to an improved solid electrolyte material. The present invention includes the use of polycrystalline silver bromide or silver sulfide bromide as the solid electrolyte material. Normally, silver bromide would not be considered to be a good electrolyte for an electrolytic cell of the coulometric type because silver bromide has a low intrinsic conductivity and this low conductivity is undesirable as it increases the IR drop and thereby reduces the voltage change when stripping is completed. However, polycrystalline silver bromide has a much higher conductivity and does operate satisfactorily as a solid electrolyte.

An even further improvement is achieved using silver sulfide bromide which has an even greater conductivity than polycrystalline silver bromide.

It would usually be assumed that the addition of the sulfide to the silver bromide would have an adverse effect on the electrolytic decomposition of the electrolyte since silver sulfide decomposes at a lower voltage than silver bromide which should in turn reduce the maximum value of the voltage surge. However, it was determined that when the voltage surge occurs, the voltage is driven past this decomposition point of the sulfide and the ultimate voltage potential of the silver sulfide bromide is essentially the same as that of the silver bromide.

Both of the above described materials have advantages over solid electrolytes that have been previously used. First, both of these materials have voltage surges which are considerably higher in value than many of the prior art solid electrolytes. Also, these materials do not pick up moisture as is common with some of the prior art solid electrolytes.

Other advantages of the electrolytes of the present invention are that they provide good interfacing with the electrodes and can be pressed into any desired shape. Also, these electrolytes may be made in relatively small thicknesses so that the total package of the electrolytic cell can be quite small.

Reference is made to the following articles which disclose in more detail the studies which have led to the present invention.

"Solid Electrolyte Coulometry; Silver Bromide Electrolyte," John J. Kennedy, Fred Chen and Andy Clifton, *Journal of the Electrochemical Society*, Vol. 115, No. 9, Sept., 1968, PP 918—924.

"Solid Electrolyte Coulometry; Silver Sulfide Bromide Electrolyte," John H. Kennedy and Fred Chen, *Journal of the Electrochemical Society*, Vol. 116, No. 2, Feb., 1969, PP 207—211.

General reference is also made to "Progress in Solid State Chemistry," Douglas O. Raleigh Vol. 3, PP 83—134, Pergamom Press (1966).

A clearer understanding of the invention will be had with reference to the following description and drawings wherein:

FIG. 1 illustrates a completed electrolytic cell of the present invention; and

FIG. 2a—2d illustrate the method of producing the electrolytic cell of FIG. 1.

In FIG. 1, a completed electrolytic cell using a solid electrolyte is shown. As can be seen in FIG. 1, the electrolytic cell includes a first electrode 10 composed of a compressed active metal such as powdered silver. A second electrode 12 is composed of a compressed inert metal such as gold powder. Sandwiched in between the electrodes 10 and 12 is the solid electrolyte 14. The solid electrolyte may be composed of compressed polycrystalline silver bromide or compressed silver sulfide bromide. Silver bromide normally has a low intrinsic conductivity which would be unacceptable for use in a coulometric type of electrolytic cell. However, it has been determined that polycrystalline silver bromide has a significantly greater conductivity and may be satisfactorily used as the solid electrolyte.

Silver bromide has certain advantages over prior art solid electrodes. First, silver bromide is not hydroscopic as are any prior art solid electrolytes. Also, the use of silver bromide as the electrolyte produces a high voltage surge when compared with other prior art solid electrolytes.

As a further improvement to the use of polycrystalline silver bromide, the solid electrolyte may be silver sulfide bromide which has an even higher conductivity than polycrystalline silver bromide and, in addition, has the other advantages mentioned above. It would normally be expected that silver sulfide bromide would be a poorer electrolyte than silver bromide since the addition of the sulfide should produce a decomposition of the electrolyte at a voltage lower than silver bromide. This would affect the amplitude of the voltage surge. However, the voltage change of the electrolytic cell at a point when all the silver is stripped off occurs so rapidly that the voltage is driven past this normal decomposition point for the sulfide so that the voltage surge for silver bromide is essentially the same as that for silver bromide.

It is to be appreciated that lead members may be attached to the electrodes 10 and 12 and that the entire electrolytic cell may be encapsulated.

It is desirable that the interface between the electrodes and the solid electrolyte of the cell shown in FIG. 1 have close contact over the entire surface and also that the contact surface be increased over that of a flat surface. The present invention also includes a method of preparation of the electrolytic cell which provides such contact surfaces between the electrodes and the solid electrolyte.

FIGS. 2a and 2d illustrate the method of preparation of the electrolytic cell of the present invention.

In FIG. 2a a first die member 100 is shown. A second die member 102 may be driven with variable pressure toward the die member 100, and the die members 100 and 102 form a die. The pressure applied to the die member 102 is represented by the arrow 104. As a first step in the preparation of the electrolytic cell, powdered silver is placed in the die and is lightly pressed within the die using the die member 102. For example, the pressure that is used may be that sufficient to lightly tamp the silver into the desired configuration or may even be pressures as high as 8,000 to 10,000 p.s.i. A quantity of 0.25 grams of silver may be used with the powdered silver having grain sizes from 5 to 10 microns. The silver in the partially pressed form 106 is shown in FIG. 2a. As can be seen in FIG. 2a, the silver 106 still has irregular surfaces since the silver has only been lightly compressed. Although the surfaces of the silver would look relatively smooth to the naked eye, a microscopic examination would indicate that the silver has many irregularities in the surface areas. These irregularities increase the surface contact between the electrode and the electrolyte.

As a second step in the preparation of the electrolytic cell using the solid electrolyte, the die member 102 is removed and powdered silver bromide or silver sulfide bromide is placed over the silver. The powdered silver bromide may be bought commercially or may be prepared using known techniques. Also, the silver sulfide bromide may be prepared using known techniques.

After the silver bromide or silver sulfide bromide is placed within the die, the die member 102 is replaced and pressure is exerted, as shown in FIG. 2b, to either tamp the silver bromide or silver sulfide bromide against the silver or a pressure of up to 10,000 p.s.i. may be used. A quantity of 0.5 grams of silver bromide or silver sulfide bromide may be used in this step of the method. It can be seen in FIG. 2b that the surface contact between the silver and the solid electrolyte 108 after this light pressing contains open areas. These have been exaggerated in FIGS. 2b and 2c since the irregularities in the surfaces are quite small. These open areas are undesirable since an intimate contact is desired between the silver and the solid electrolyte 108.

As a third step in the process, the die member 102 may again be removed and a quantity of a powdered inert metal such as 0.5 grams of powdered gold having grain sizes of 5 to 15 microns is placed over the solid electrolyte 108 and the powdered gold is pressed into position using a light pressure. For example, the powdered gold may be tamped into position or may be lightly compressed using a pressure of up to 10,000 p.s.i. The lightly compressed gold 110 is not intimate contact with the surface of the electrolyte 108, as shown in FIG. 2c.

The final step in the process is to compress the die member 102 with a very high pressure, such as a pressure of 60,000 p.s.i., which high pressure is represented by the double arrows 112. As a further improvement, a vacuum may be pulled in the die as shown in FIGS. 2d, which vacuum eliminates gases which may have been trapped in the lightly compressed powdered materials 106, 108 and 110 shown in FIG. 2d.

After the high pressure and vacuum, the surface contact between the electrodes and the solid electrolyte becomes very intimate. Although the interface has an irregular appearance, the contact between the electrodes and solid electrolyte is very intimate and the completed electrolytic cell as shown in FIG. 1 includes the silver electrode 10, the gold electrode 12 and the solid electrolyte 14. The use of the double compression technique described above provides for a large contact area between the electrodes and the electrolyte because of the irregularities but still there is a very intimate contact between the electrodes and the electrolyte.

The present invention is therefore directed to an improved solid electrolytic cell using polycrystalline silver bromide or silver sulfide bromide as the solid electrolyte. The invention also includes a method of preparing the electrolytic cell including first lightly compressing powdered materials to form the electrodes and the electrolyte and then using high compression to compact the electrodes and the solid electrolytic material and to produce an intimate contact between the electrodes and the solid electrolyte at the interfaces.

The present invention, although described with reference to a particular embodiment, is only to be limited by the appended claims.

It is to be appreciated that certain modifications may be made. For example, in the method of preparing the electrolytic cell, the powdered gold may be first inserted into the die and the solid electrolyte may be placed on top of the powdered gold after it is lightly compressed. The powdered silver would then be added as the last step. It is to be appreciated that this is merely a reversal of the process described with reference to FIGS. 2a to 2d.

I claim:

1. In an electrolytic cell having a first electrode with a silver surface and a second electrode spaced from the first electrode and with a surface more chemically nonreactive than the silver surface, a solid electrolyte in contact and electrochemically active with the silver surface and in contact with and chemically inert relative to the surface on the second electrode,
the solid electrolyte comprising polycrystalline silver bromide (AgBr) or silver sulfide bromide ($Ag_3SBr$).

2. In the electrolytic cell set forth in claim 1 the solid electrode being compressed into intimate contact with the silver surface of the first electrode and the surface more chemically nonreactive than the silver surface of the second electrode.

3. An electrolytic cell in combination, comprising
a solid electrolyte, a first electrode having a silver surface in contact and electrochemically active with said electrolyte, and
a second electrode spaced from the first electrode having a surface in contact and chemically inert to said electrolyte, said solid electrolyte comprising polycrystalline silver bromide (AgBr) or silver sulfide bromide ($Ag_3SBr$).

4. The electrolytic cell set forth in claim 3 wherein the first electrode is compressed powdered silver.

5. The electrolytic cell set forth in claim 3 wherein the second electrode is compressed powdered gold.

6. The electrolytic cell set forth in claim 3 wherein the first electrode is powdered silver, the second electrode is a powdered metal, and wherein the first and second electrode are compressed into intimate contact with the solid electrolyte.